(12) United States Patent
Ragupathi et al.

(10) Patent No.: US 9,665,156 B2
(45) Date of Patent: May 30, 2017

(54) SYSTEMS AND METHODS FOR PROVIDING WAKE-ON-LAN (WOL) SUPPORT

(71) Applicant: Dell Products L.P., Round Rock, TX (US)

(72) Inventors: Dinesh Kunnathur Ragupathi, Round Rock, TX (US); Arun Muthaiyan, Round Rock, TX (US); Venkatesh Ramamoorthy, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 88 days.

(21) Appl. No.: 14/815,582

(22) Filed: Jul. 31, 2015

(65) Prior Publication Data

US 2017/0031422 A1    Feb. 2, 2017

(51) Int. Cl.
  *G06F 1/26* (2006.01)
  *G06F 1/32* (2006.01)
  *H04L 12/12* (2006.01)
  *H04L 12/741* (2013.01)

(52) U.S. Cl.
  CPC ............ *G06F 1/3209* (2013.01); *H04L 12/12* (2013.01); *H04L 45/745* (2013.01)

(58) Field of Classification Search
  CPC ...... G06F 1/3209; H04L 12/12; H04L 45/745
  USPC ......................................... 713/300, 310, 320
  See application file for complete search history.

(56) References Cited

U.S. PATENT DOCUMENTS

| | | | |
|---|---|---|---|
| 7,383,454 B2* | 6/2008 | Loffink | G06F 1/32 713/300 |
| 8,112,534 B2 | 2/2012 | Hernandez et al. | |
| 8,332,869 B2 | 12/2012 | Stevens, IV | |
| 8,935,555 B2* | 1/2015 | Loffink | H04L 49/40 713/300 |
| 9,170,633 B2* | 10/2015 | Suurballe | G06F 1/3203 |
| 2010/0191989 A1 | 7/2010 | Khatri et al. | |
| 2012/0120958 A1* | 5/2012 | Mahadevan | H04L 12/12 370/392 |
| 2015/0082063 A1* | 3/2015 | Peterson | G06F 13/40 713/323 |

* cited by examiner

*Primary Examiner* — Mark Connolly
(74) *Attorney, Agent, or Firm* — Jackson Walker L.L.P.

(57) ABSTRACT

A controller may be configured to receive a wake-up message, the wake-up message including an address identifying a particular one of a plurality of information handling systems to be awakened from a non-awake state of the particular information handling system. The controller may also be configured to identify the particular information handling system based at least on the address included in the received wake-up message. The controller may further be configured to cause a host management controller of the particular information handling system to awaken from a non-awake state of the host management controller. The controller may also be configured to, after the host management controller of the particular information handling system has awakened, forward the wake-up message to the particular information handling system to cause the particular information handling system to awaken.

19 Claims, 4 Drawing Sheets

FIG. 4

SYSTEMS AND METHODS FOR PROVIDING WAKE-ON-LAN (WOL) SUPPORT

TECHNICAL FIELD

The present disclosure relates in general to remote management of information handling systems, and more particularly to systems and methods for providing wake on LAN (WoL) support using an input/output module and management controller as a network interface proxy.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Remote control or management of information handling systems has become an important aspect of network management. For example, Wake on LAN (WoL) technology has become an invaluable addition to networks of managed information handling systems, as it allows an administrator to power on an information handling system remotely, e.g., for system backups, installation of new software, or providing other maintenance.

WoL support is typically implemented in the motherboard of the information handling system. Most modern motherboards with an embedded Ethernet controller (e.g., LAN on motherboard or "LOM") support WoL without the need for an external WoL cable. Older motherboards may require a WAKEUP-LINK header onboard and connected to the network card via a special 3-pin cable.

In general, waking up an information handling system in a local area network or "LAN" (e.g., a server blade) remotely may be explained as follows. The target blade is shut down, although power is still supplied to the blade's network card. The network card listens for a specific broadcast packet, called the "Magic Packet." The blade receives the Magic Packet, checks it for the correct information, and then boots if the Magic Packet is valid.

The Magic Packet is a broadcast frame that can be sent over a variety of connectionless protocols (e.g., UDP or IPX), with UDP being the most commonly used. The data contained in a Magic Packet may be defined constant as represented in hexadecimal: FF FF FF FF FF FF followed by sixteen repetitions of the target computer's MAC address, sometimes followed by a four or six byte password.

WoL is fairly easy to implement at the network controller level, but has some inherent drawbacks. In particular, as mentioned above, WoL requires that the target computer's network card remains powered in order to listen for the Magic Packet or similar wake-up message. This may be especially undesirable in blade systems where the high density of computer resources and network controllers may place a fairly large power demand on the power subsystem even in cases where the blades are otherwise powered down. Historically, some blade implementers have avoided supporting WoL at least in part due to this power management issue.

This power management issue was addressed in part by the systems and methods described in U.S. Pat. No. 8,332,869 in which a chassis management controller of a chassis housing the blade servers may act as a network proxy for receiving a WoL packet. However, the approach described in such patent also has limitations, in that it requires a host management controller of a blade server to be powered on in order to wake the blade server, which requires auxiliary power. Other limitations are that a remote information handling system can only send the WoL packet through a dedicated management network instead of the "in-band" communication interface of the blade server and thus there is not support for a "multi-homed" blade server which uses different input/output modules for in-band communication. Yet another limitation is that it requires significant processing by a chassis management controller to scan and process packets for WoL support.

SUMMARY

In accordance with the teachings of the present disclosure, the disadvantages and problems associated with providing Wake on LAN (WoL) support may be reduced or eliminated.

In accordance with embodiments of the present disclosure, a system may include a plurality of information handling systems, each including a first network interface for communicating with a network and a host management controller for managing the operation of various components of such information handling system wherein the host management controller includes a second network interface for communicating with the network and a controller coupled to and configured to manage the plurality of information handling systems via their respective host management controllers. The controller may be configured to receive a wake-up message, the wake-up message including an address identifying a particular one of the information handling systems to be awakened from a non-awake state of the particular information handling system. The controller may also be configured to identify the particular information handling system based at least on the address included in the received wake-up message. The controller may further be configured to cause a host management controller of the particular information handling system to awaken from a non-awake state of the host management controller. The controller may also be configured to, after the host management controller of the particular information handling system has awakened, forward the wake-up message to the particular information handling system to cause the particular information handling system to awaken.

In accordance with these and other embodiments of the present disclosure, a system may include a plurality of information handling systems, each including a first network interface for communicating with a network and a host management controller for managing the operation of various components of such information handling system wherein the host management controller includes a second network interface for communicating with the network, an input/output module, and a controller coupled to and configured to manage the plurality of information handling systems via their respective host management controllers. The input/output module may be configured to manage communication of data between the network and the first network interface of each of the plurality of information handling systems. The input/output module may also be configured to receive a wake-up message, the wake-up message including an address identifying a particular one of the information handling systems to be awakened from a non-awake state of the particular information handling system. The input/output module may further be configured to identify the particular information handling system based at least on the address included in the received wake-up message. The input/output module may additionally be configured to forward the wake-up message to a controller responsive to determining the particular information handling system is enabled for being awakened by the wake-up message. The controller may be configured to receive the wake-up message from the input/output module, identify the particular information handling system based at least on the address included in the received wake-up message, and forward the wake-up message to the particular information handling system to cause the particular information handling system to awaken.

In accordance with these and other embodiments of the present disclosure, a system may include a plurality of information handling systems, each including a first network interface for communicating with a network and a host management controller for managing the operation of various components of such information handling system wherein the host management controller includes a second network interface for communicating with the network, and a controller. The controller may be coupled to and configured to manage the plurality of information handling systems via their respective host management controllers. The controller may be configured to receive a wake-up message, the wake-up message including an address identifying a particular target comprising a particular one of the information handling systems or a particular one of the host management controllers to be awakened from a non-awake state. The controller may also be configured to identify the particular target based at least on the address included in the received wake-up message. The controller may further be configured to, in response to identifying the particular target of the wake-up message as a particular one of the information handling systems, cause the particular information handling system to awaken. The controller may additionally be configured to, in response to identifying the particular target of the wake-up message as a particular one of the host management controllers, causing the particular host management controller to awaken.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1-4, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU"), microcontroller, or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

Figure 1:
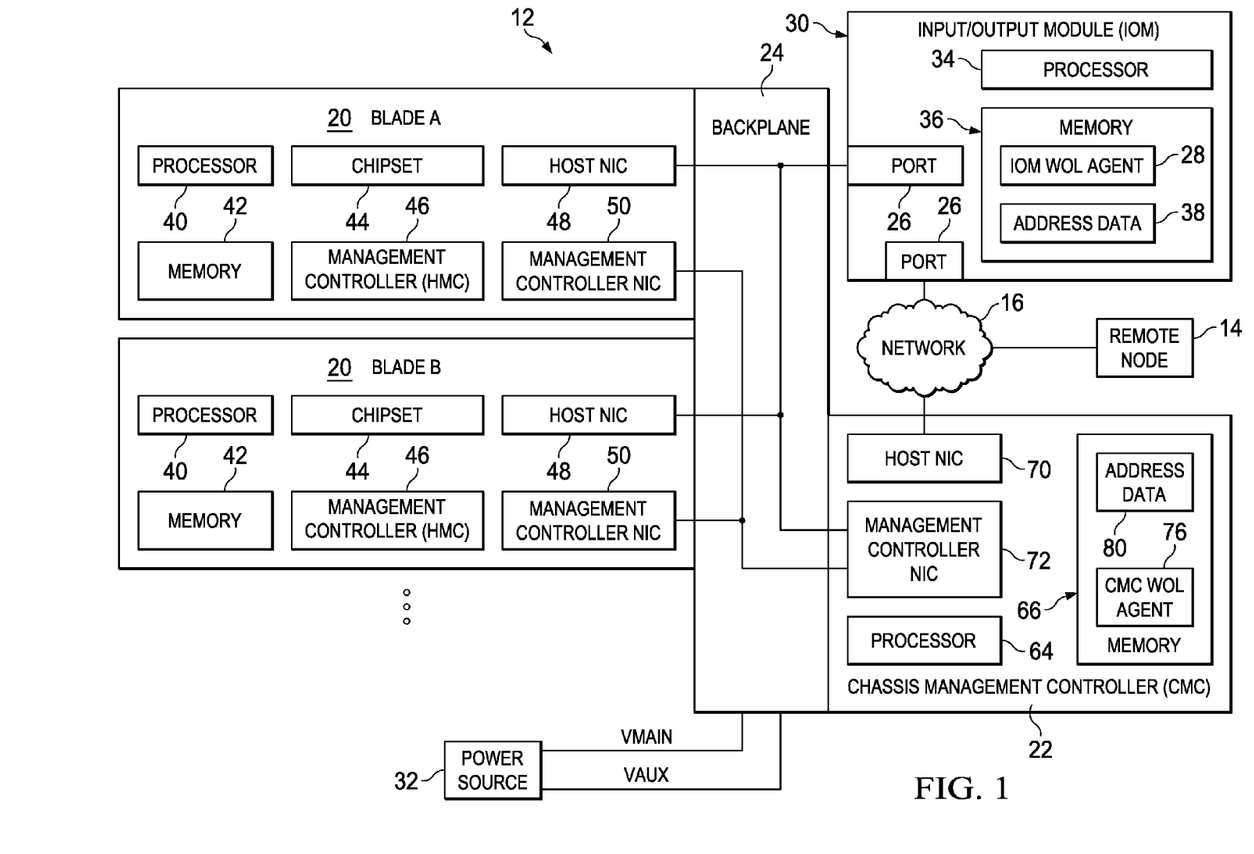
FIG. 1 illustrates an example system for providing virtual Wake on LAN (WoL) support using a chassis management controller and an input/output module as network interface proxies, in accordance with embodiments of the present disclosure.

FIG. 1 illustrates a system 12 for providing virtual Wake on LAN (WoL) support using a management controller and one or more input/output modules as network interface proxies, in accordance with embodiments of the present disclosure. System 12 may comprise any one or more information handling systems. In some embodiments, such as the example embodiment shown in FIG. 1 and discussed below, system 12 may comprise a multi-blade server system 12 coupled to a remote node 14 via a network 16.

System 12 may include any number of server blades 20 and a chassis management controller (CMC) 22 coupled to a backplane 24. System 12 may also include an input/output module (IOM) 30 providing an interface to network 16, and a power source 32 for providing power to system 12.

Each server blade 20 may comprise any information handling system configured to be awakened or booted remotely, e.g., via network 16. For example, each blade 20 may be configured for virtual WoL support such that a blade 20 may be awakened in response to a wake-up message received from a remote node 14 via network 16 by either of IOM 30 or CMC 22. As used herein, a "wake-up message" or "wake-up packet" may refer to any message or communication used for waking (e.g., booting or powering up) one or more information handling systems (e.g., one or more blades 20) from a non-awake status (e.g., a sleep, standby, or powered down status). For example, wake-up messages may include Magic Packets; ping communications; or various other so-called "interesting packet" types or protocols, e.g., Direct IP, ARP, Neighbor Discovery Multicast Address packet, Internetwork Package Exchange (IPX) Diagnostic Packet, or NetBIOS Name Query packet. In addition, a "wake-up message" may be a signal or other event that triggers a wake-up. Thus, a network event detected by an information handling resource (e.g., a host management controller 46, CMC 22, or IOM 30 which are discussed below) that causes a blade 20 to wake up may be referred to as a "wake-up message" despite not including a "message" per se. Such events may include, e.g., a link status change event detected by host management controller 46, CMC 22, or IOM 30.

Backplane 24 may comprise any physical and/or electrical devices for connecting the various components of system 12 to each other. For example, in the illustrated embodiment, backplane 24 may comprise any physical and/or electrical devices for connecting blades 20, CMC 22, IOM 30, and/or any other components of system 12 to each other. In some embodiments, backplane 24 may comprise a circuit board with connections for receiving blades 20, CMC 22 and IOM 30. Backplane 24 may include one or more buses and/or other communication channels for communicating data among blades 20, CMC 22, and IOM 30. Although the term "backplane" is used herein, a midplane or other suitable device for interconnecting blades 20, CMC 22, and IOM 30 may similarly be used.

IOM 30 may comprise any suitable switch, router, or other device for switching, routing, and/or otherwise managing the communication of data between network 16 and multiple blades 20. As shown in FIG. 1, IOM 30 may include a processor 34, memory 36, and one or more ports 26.

Processor 34 may comprise any system, device, or apparatus operable to interpret and/or execute program instructions and/or process data, and may include, without limitation a microprocessor, microcontroller, digital signal processor (DSP), application specific integrated circuit (ASIC), or any other digital or analog circuitry configured to interpret and/or execute software, firmware, or other program instructions and/or process data. In some embodiments, processor 34 may interpret and/or execute software or program instructions and/or process data stored in memory 36 and/or another component of IOM 30.

Memory 36 may be communicatively coupled to processor 34 and may comprise any system, device, or apparatus operable to retain program instructions or data for a period of time. Memory 36 may comprise random access memory (RAM), electrically erasable programmable read-only memory (EEPROM), a PCMCIA card, flash memory, magnetic storage, opto-magnetic storage, or any suitable selection and/or array of volatile or non-volatile memory.

In some embodiments, memory 36 may store address data 38 and an IOM WoL agent 28 comprising program instructions for processing a received wake-up message (e.g., a Magic Packet). As used herein, "processing" a wake-up message by IOM 30 may include any one, some, or all of the following functions:

(a) Receiving from CMC 22 address data regarding blades 20 managed by CMC.

(b) Identifying the message as a wake-up message. This may include any number of sub-processes, e.g., (i) identifying a packet type (UDP, etc.), (ii) identifying an IP port for the packet, and (iii) determining whether the packet is a wake-up message (e.g., a Magic Packet).

(c) Determining whether the wake-up message is intended for a blade 20 managed by CMC 22 and/or identifying a particular blade 20 for which the wake-up message is intended. This also may include any number of sub-processes, e.g., (i) identifying an address in the wake-up message (such as a MAC address, for example), (ii) accessing a list of addresses (e.g., MAC addresses) for each blade 20 managed by CMC 22, (iii) determining whether the address identified in the wake-up message matches an address for any of the blades 20 managed by CMC 22; and (iv) identifying the particular blade 20 that matches the address in the wake-up message.

(d) Forwarding the wake-up message CMC 22, which may perform further processing as described in greater detail below.

(e) Any other one or more functions suitable for processing and/or forwarding a wake-up message to CMC 22, as described elsewhere herein.

Ports 26 may be communicatively coupled to processor 34 and may comprise any suitable interface for switching, routing, and/or otherwise communicating data between network 16 and blades 20.

Power source 32 may comprise any one or more sources of power for providing power to one, some or all components of system 12. For example, power source 32 may include one or more AC-DC converters to convert AC power (e.g., from a utility outlet) to DC power to supply to components of system 12. In some embodiments, power source 32 may include redundant or backup power supplies. In addition, power source 32 may provide (a) a main power supply, indicated in FIG. 1 as Vmain, and (b) an auxiliary power supply, indicated in FIG. 1 as Vaux. Vmain may generally be used to provide power to blades 20 when operating at full power, and CMC 22 and IOM 30 when the chassis is powered on. Vaux may generally be used to provide power to auxiliary components, e.g., when Vmain is not being supplied to one or more blades 20. For example, Vaux may be used to provide power to network interface devices of blades 20 and CMC 22 (e.g., devices 46, 48, 50, 70 and/or 72 discussed below).

As shown in FIG. 1, each blade 20 may include a processor 40, memory 42, a chipset 44, a host management controller (HMC) 46, one or more host network interface devices 48, and a management controller network interface device 50.

Processor 40 may comprise any system, device, or apparatus operable to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 40 may interpret and/or execute program instructions and/or process data stored in memory 42 and/or another component of blade 20.

Memory 42 may be communicatively coupled to processor 40 and may comprise any system, device, or apparatus operable to retain program instructions or data for a period of time. Memory 42 may comprise random access memory (RAM), electrically erasable programmable read-only memory (EEPROM), a PCMCIA card, flash memory, magnetic storage, opto-magnetic storage, or any suitable selection and/or array of volatile or non-volatile memory.

Chipset 44 may include a set of specialized chips for allowing communication between various components of blade 20. For example, chipset 44 may include northbridge and southbridge chips linking processor 40 with other components or peripherals of blade 20, e.g., HMC 46, host network interface device 48, and/or management controller network interface device 50. In some embodiments, chipset 44 may include one or more on-integrated peripherals, e.g., Ethernet and/or USB.

HMC 46 may comprise any system or device for managing the operation of various components of blade 20. In some embodiments, HMC 46 may include a microcontroller with memory and one or more communication interfaces for communications both internal and external to blade 20. In some embodiments, HMC 46 may be a baseboard management controller (BMC), which in some instances may be integrated with portions of management controller network interface device 50.

In some embodiments, HMC 46 may be operable to receive instructions from CMC 22 and control processor 40 or other component(s) of blade 20 to perform various management functions.

Host network interface device(s) 48 may include any one or more interfaces for communicatively connecting blade 20 to network 16, e.g., any combination of one or more of a network interface card (NIC), LAN on motherboard (LOM), Ethernet adapter card, etc. A host network interface device 48 may be operable to receive data from network 16.

Management controller network interface device 50 may provide a communications interface between blade 20 and CMC 22 via backplane 24. For example, management controller network interface device 50 may include a network interface card (NIC), Ethernet adapter card, etc. In some embodiments, management controller network interface device 50 may be operable to receive management data from CMC 22.

As shown in FIG. 1, CMC 22 may include a processor 64, memory 66, one or more host network interface devices 70, and a management controller network interface device 72.

Processor 64 may comprise any system, device, or apparatus operable to interpret and/or execute program instructions and/or process data, and may include, without limitation a microprocessor, microcontroller, digital signal processor (DSP), application specific integrated circuit (ASIC), or any other digital or analog circuitry configured to interpret and/or execute software, firmware, or other program instructions and/or process data. In some embodiments, processor 64 may interpret and/or execute software or program instructions and/or process data stored in memory 66 and/or another component of CMC 22.

Memory 66 may be communicatively coupled to processor 64 and may comprise any system, device, or apparatus operable to retain program instructions or data for a period of time. Memory 66 may comprise random access memory (RAM), electrically erasable programmable read-only memory (EEPROM), a PCMCIA card, flash memory, magnetic storage, opto-magnetic storage, or any suitable selection and/or array of volatile or non-volatile memory. Memory 66 may include a basic input/output system (BIOS), which may include a set of instructions executed by processor 64 to boot CMC 22.

In some embodiments, memory 66 may store address data 80 and/or a CMC WoL agent 76 comprising a program of instructions for processing a received wake-up message (e.g., a Magic Packet). As used herein, "processing" a wake-up message by CMC 22 may include any one, some, or all of the following functions:

(a) Receiving a wake-up message forwarded from IOM 30 or from network 16 via host NIC 70.

(b) Identifying the message as a wake-up message. This may include any number of sub-processes, e.g., (i) identifying a packet type (UDP, etc.), (ii) identifying an IP port for the packet, and (iii) determining whether the packet is a wake-up message (e.g., a Magic Packet).

(c) Determining whether the wake-up message is intended for a blade 20 or HMC 46 managed by CMC 22 and/or identifying a particular blade 20 or HMC 46 for which the wake-up message is intended. This also may include any number of sub-processes, e.g., (i) identifying an address in the wake-up message (such as a MAC address, for example), (ii) accessing a list of CMC 22 (e.g., MAC addresses) for each blade 20 and HMC managed by CMC 22, (iii) determining whether the address identified in the wake-up message matches an address for any of the blades 20 or HMCs 46 managed by CMC 22; and (iv) identifying the particular blade 20 or HMC 46 that matches the address in the wake-up message.

(c) If a particular blade 20 is identified as the intended target for the wake-up message, powering on an HMC 46 of the particular blade 20, followed by powering on the particular blade itself.

(d) If an HMC 46 is identified as the intended target for the wake-up message, powering on an HMC 46.

(e) Any other one or more functions suitable for processing a wake-up message for an intended blade 20 or intended HMC 46 and powering on such blade 20 or HMC 46 in response.

Host network interface device(s) 70 may include any one or more interfaces for communicatively connecting CMC 22 to network 16, e.g., any combination of one or more of a network interface card (NIC), LAN on motherboard (LOM), Ethernet adapter card, etc.

A host network interface device 70 may be operable to receive data from network 16.

Management controller network interface device 72 may provide a communications interface between CMC 22 and blades 20 via a management communication channel. For example, management controller network interface device 72 may include a network interface card (NIC), Ethernet controller, etc. In some embodiments, management controller network interface device 72 may be operable to forward management data to one or more blades 20 via a management communication channel.

In addition to the information handling resources depicted in FIG. 1, system 12 may include one or more other information handling resources.

Figure 2:
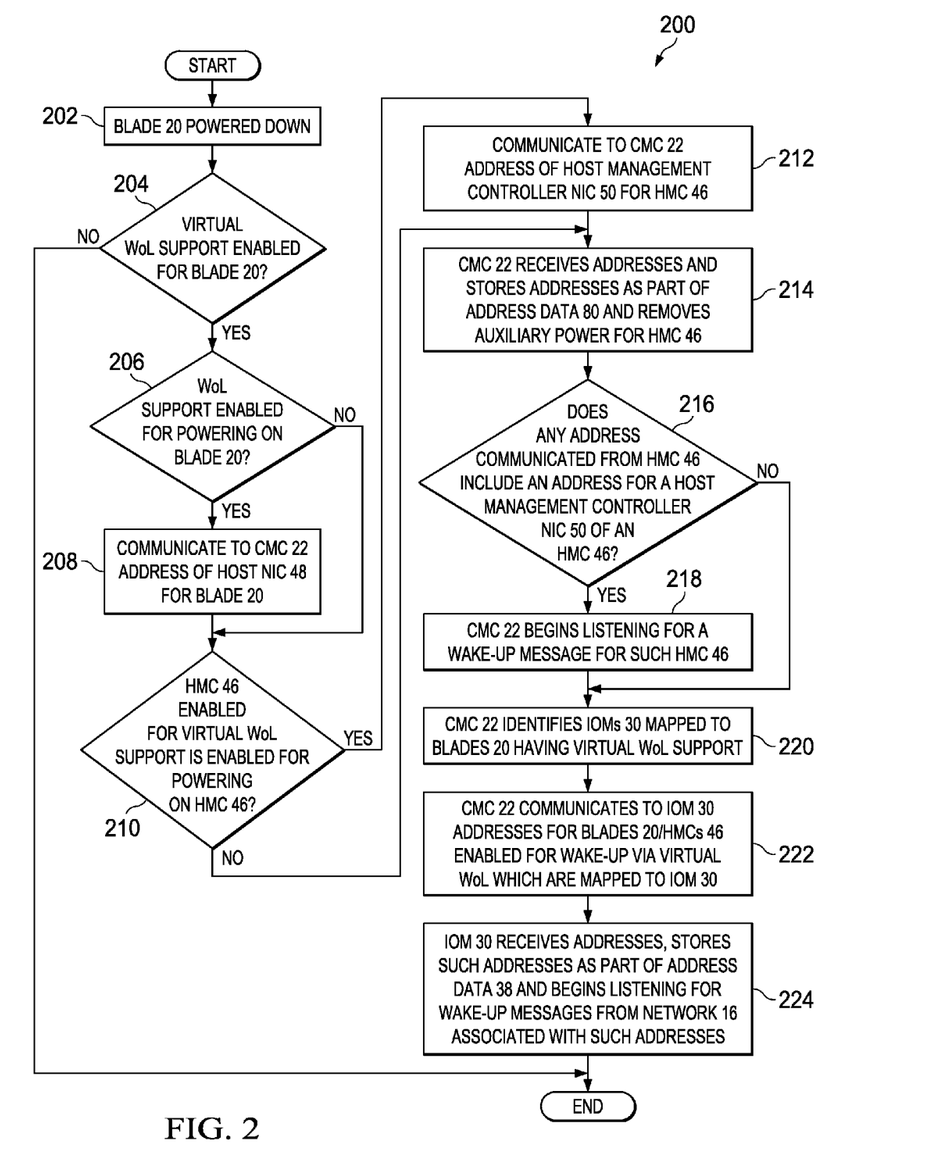
FIG. 2 illustrates a flow chart of an example method for managing a remote wake-up of information handling systems and host management controllers using a chassis management controller and an input/output module as network interface proxies, in accordance with embodiments of the present disclosure.

FIG. 2 illustrates a flow chart of an example method 200 for managing a remote wake-up of blades 20 and HMCs 46 using CMC 22 and an IOM 30 as network interface proxies, in accordance with embodiments of the present disclosure. According to some embodiments, method 200 may begin at step 202. As noted above, teachings of the present disclosure may be implemented in a variety of configurations of system 12. As such, the preferred initialization point for method 200 and the order of the steps comprising method 200 may depend on the implementation chosen.

At step 202, a power down event for a blade 20 may occur. In response to the power down event, at step 204 an HMC 46 resident on such blade 20 may determine whether virtual WoL support is enabled for blade 20. If virtual WoL support is enabled, method 200 may proceed to step 206. Otherwise, method 200 may end.

At step 206, in response to determining that virtual WoL support is enabled on blade 20, its HMC 46 may determine if WoL support is enabled to power on blade 20 to allow CMC 22 and/or IOM 30 to act as network interface proxies to facilitate remote wake-up of blade 20. If blade 20 is enabled for powering on with virtual WoL support, method 200 may proceed to step 208. Otherwise, method 200 may proceed to step 210.

At step 208, in response to determining blade 20 is enabled for virtual WoL support for powering on blade 20, HMC 46 may communicate to CMC 22 the address (e.g., MAC address) of a host NIC 48 for blade 20.

At step 210, an HMC 46 resident on such blade 20 may determine whether HMC 46 itself is enabled for virtual WoL support to allow CMC 22 (and in some embodiments, IOM 30) to act as a network interface proxy to facilitate remote wake-up of HMC 46 (e.g., without also waking up blade 20 on which HMC 46 resides). If HMC 46 is enabled for virtual WoL support, method 200 may proceed to step 212. Otherwise, method 200 may proceed to step 214.

At step 212, in response to determining HMC 46 is enabled for virtual WoL support for powering on HMC 46, HMC 46 may communicate to CMC 22 the address (e.g., MAC address) of a host management controller NIC 50 for HMC 46.

At step 214, CMC 22 may receive the addresses communicated at one or both of steps 208 and 212 and store such addresses as part of address data 80 and remove auxiliary power for HMC 46 and its host management controller NIC 50 such that HMC 46 and its associated management controller NIC 50 are powered down in addition to blade 20 and its various information handling resources. Thus, as compared to existing approaches for WoL support as described in the "Background" section in which auxiliary power is maintained for an HMC 46 to receive a wake-up message, the approaches described herein may require less power due to an HMC 46 being powered down when its blade 20 is powered down.

At step 216, CMC 22 may determine if any address communicated from HMC 46 includes an address for a host management controller NIC 50 of an HMC 46. If any address includes that of a host management controller NIC 50 of an HMC 46, method 200 may proceed to step 218. Otherwise, method 200 may proceed to step 220.

At step 218, in response to an address communicated from an HMC 46 being that of a host management controller NIC 50 of an HMC 46, CMC 22 may begin listening for a wake-up message for such HMC 46. Because a wake-up message intended for an HMC 46 may be expected from "out-of-band" management traffic received at host NIC 70 rather than "in-band" traffic received via IOM 30, some of such wake-up messages may in some embodiments be processed entirely by CMC 22 rather than being processed in any manner by IOM 30.

At step 220, CMC 22 may identify one or more IOMs 30 mapped to blades 20 having virtual WoL support. Although FIG. 1 depicts only a single IOM 30 for purposes of clarity of exposition, in some embodiments, system 12 may comprise a plurality of IOMs 30. In some of such embodiments, a blade 20 may be "multi-homed" meaning it is mapped to more than one IOM 30.

At step 222, CMC 22 may communicate to TOM 30 the addresses for blades 20 enabled for wake-up via virtual WoL which are mapped to TOM 30. In some embodiments, HMCs 46 of blades 20 mapped to TOM 30 may also be communicated to TOM 30, depending on whether such embodiment supports receipt of wake-up messages for an HMC 46 to be received over the "in-band" network of a blade 20 in addition to or in lieu of receipt of wake-up messages for an HMC 46 within "out-of-band" management traffic received at host NIC 70.

At step 224, IOM 30 may receive the addresses communicated at step 222 and store such addresses as part of address data 38 and begin listening for wake-up messages from network 16 associated with such addresses. After completion of step 224, method 200 may end.

Although FIG. 2 discloses a particular number of steps to be taken with respect to method 200, method 200 may be executed with greater or fewer steps than those depicted in FIG. 2. In addition, although FIG. 2 discloses a certain order of steps to be taken with respect to method 200, the steps comprising method 200 may be completed in any suitable order.

Method 200 may be implemented using system 12 or any other system operable to implement method 200. In certain embodiments, method 200 may be implemented partially or fully in software and/or firmware embodied in computer-readable media. For example portions of method 200 may be implemented in whole or part by CMC WoL agent 76 and/or IOM WoL agent 28.

Figure 3:
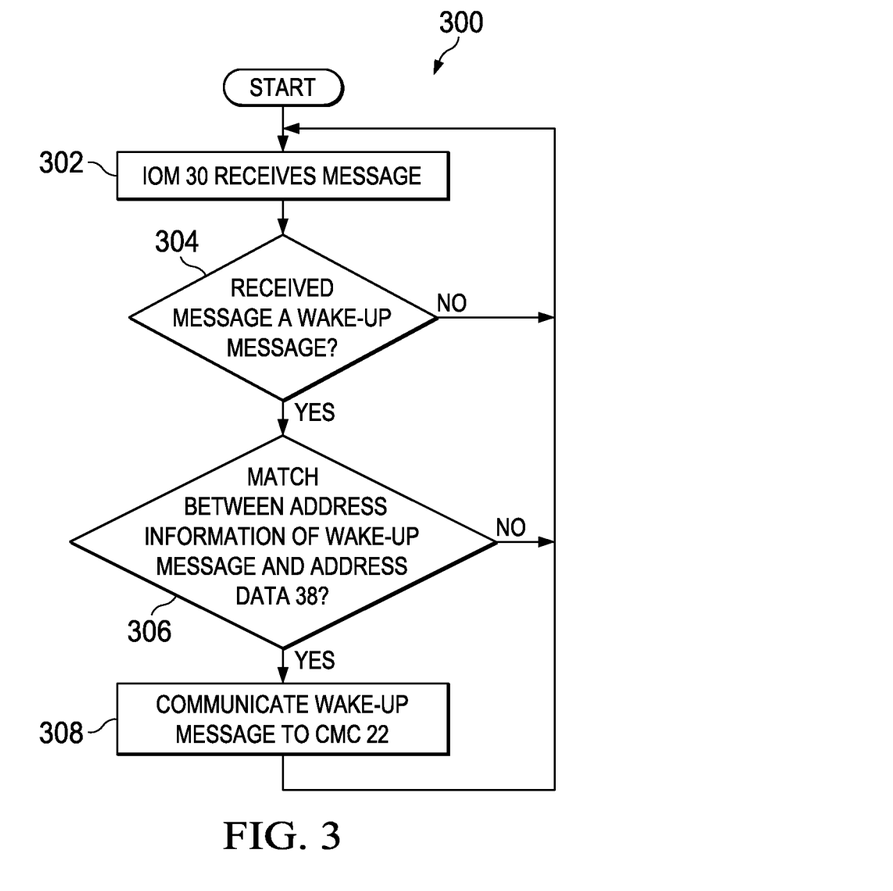
FIG. 3 illustrates a flow chart of an example method for packet processing by an input/output module, in accordance with embodiments of the present disclosure.

FIG. 3 illustrates a flow chart of an example method 300 for packet processing by IOM 30, in accordance with embodiments of the present disclosure. According to some embodiments, method 300 may begin at step 302. As noted above, teachings of the present disclosure may be implemented in a variety of configurations of system 12. As such, the preferred initialization point for method 300 and the order of the steps comprising method 300 may depend on the implementation chosen.

At step 302, IOM 30 may receive a message. At step 304, IOM 30 may determine if the received message is a wake-up message. If the received message is a wake-up message, method 300 may proceed to step 306. Otherwise, method 300 may proceed again to step 302.

At step 306, in response to determining that the received message is a wake-up message, IOM 30 may compare address information of the message to address data 38. If a match between the address information of the message and address data 38 is found, method 300 may proceed to step 308. Otherwise, method 300 may proceed again to step 302.

At step 308, in response to finding a match between address information of the wake-up message and an entry in address data 38, IOM 30 may communicate the wake-up message to CMC 22. After completion of step 308, method 300 may proceed again to step 302.

Although FIG. 3 discloses a particular number of steps to be taken with respect to method 300, method 300 may be executed with greater or fewer steps than those depicted in FIG. 3. In addition, although FIG. 3 discloses a certain order of steps to be taken with respect to method 300, the steps comprising method 300 may be completed in any suitable order.

Method 300 may be implemented using system 12 or any other system operable to implement method 300. In certain embodiments, method 300 may be implemented partially or fully in software and/or firmware embodied in computer-readable media. For example, in some embodiments, method 300 may be implemented in whole or part by IOM WoL agent 28.

Figure 4:
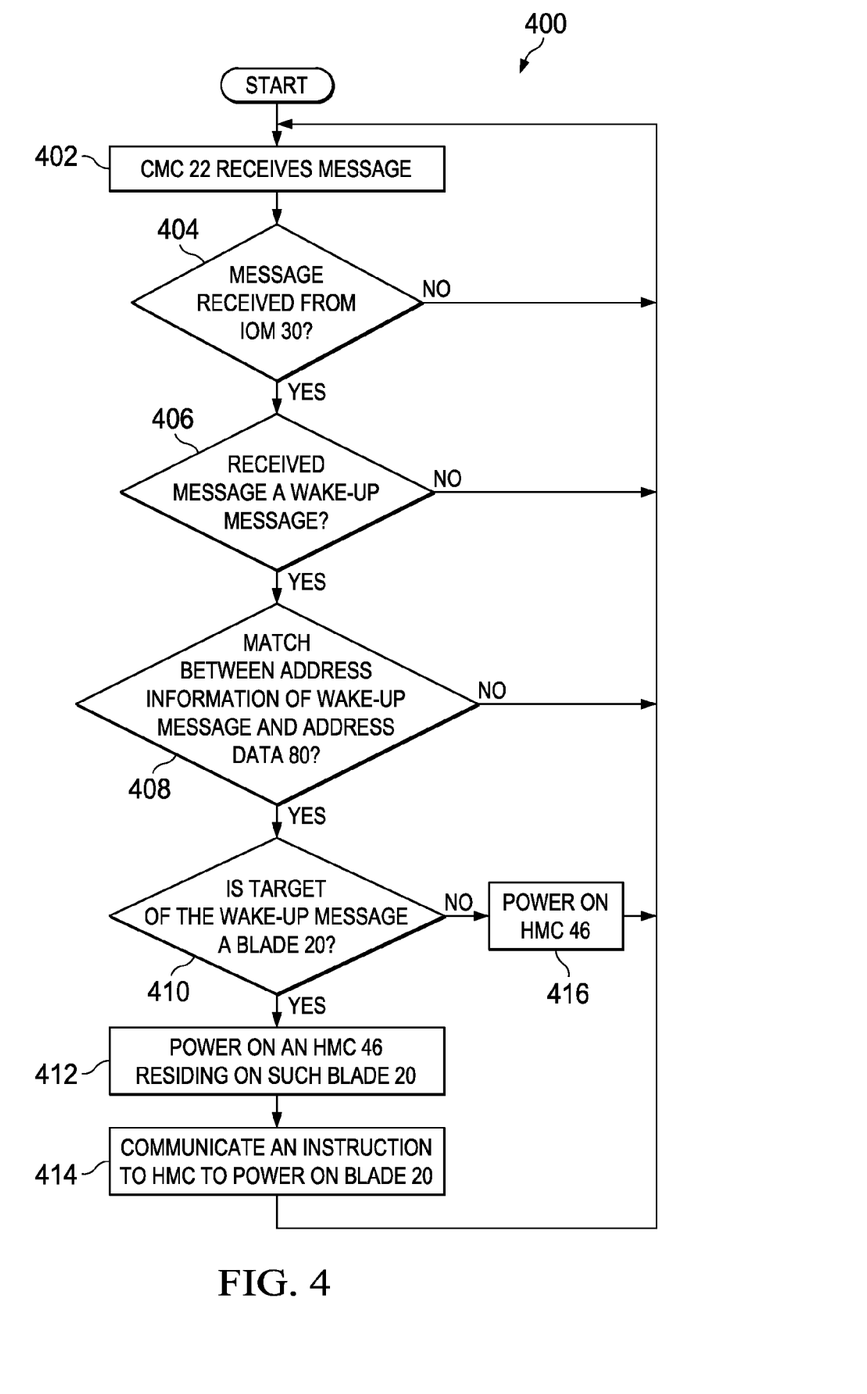
FIG. 4 illustrates a flow chart of an example method for packet processing by a chassis management controller, in accordance with embodiments of the present disclosure.

FIG. 4 illustrates a flow chart of an example method for packet processing by a chassis management controller, in accordance with embodiments of the present disclosure. According to some embodiments, method 400 may begin at step 402. As noted above, teachings of the present disclosure may be implemented in a variety of configurations of system 12. As such, the preferred initialization point for method 400 and the order of the steps comprising method 400 may depend on the implementation chosen.

At step 402, CMC 22 may receive a message. At step 404, CMC 22 may determine if the received message was received from IOM 30. If the message was received from IOM 30, method 400 may proceed to step 410. Otherwise, if the message was received from network 16 via host NIC 70, method 400 may proceed to step 406.

At step 406, CMC 22 may determine if the received message is a wake-up message. If the received message is a wake-up message, method 400 may proceed to step 408. Otherwise, method 400 may proceed again to step 402.

At step 408, in response to determining that the received message is a wake-up message, CMC 22 may compare address information of the message to address data 80. If a match between the address information of the message and address data 80 is found, method 400 may proceed to step 410. Otherwise, method 300 may proceed again to step 402.

At step 410, CMC 22 may determine if the target of the wake-up message is a blade 20, indicating that such blade 20 should be powered-on. If the target of the wake-up message is a blade 20 (e.g., as may be indicated by address information set forth in the wake-up message), method 400 may proceed to step 412. Otherwise, if the target of the wake-up message is an HMC 46, indicating that an HMC 46 but not its associated blade 20 should be powered on, method 400 may proceed to step 416.

At step 412, in response to the target of the wake-up message being determined to be a blade 20, CMC 22 may first power on an HMC 46 residing on such blade 20. At step 414, once HMC 46 has been powered on and has initialized (e.g., booted), CMC 22 may communicate an instruction to HMC 46 to power on blade 20. After completion of step 414, method 400 may proceed again to step 402.

At step 416, in response to the target of the wake-up message being determined to be an HMC 46, CMC 22 may power on such HMC 46, but issue no further instruction to power on a blade 20 on which such HMC 46 resides. After completion of step 414, method 400 may proceed again to step 416.

Although FIG. 4 discloses a particular number of steps to be taken with respect to method 400, method 400 may be executed with greater or fewer steps than those depicted in FIG. 4. In addition, although FIG. 4 discloses a certain order of steps to be taken with respect to method 400, the steps comprising method 400 may be completed in any suitable order.

Method 400 may be implemented using system 12 or any other system operable to implement method 400. In certain embodiments, method 400 may be implemented partially or fully in software and/or firmware embodied in computer-readable media. For example, in some embodiments, method 400 may be implemented in whole or part by CMC WoL agent 76.

In certain embodiments, some of the functionality described herein as being performed by CMC 22 may be performed by another information handling resource of system 12. For example, in some embodiments, such functionality may be performed by an enclosure controller or a rack switch of a rack server.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A system, comprising:
a plurality of information handling systems, each including a first network interface for communicating with a network and a host management controller for managing the operation of various components of such information handling system wherein the host management controller includes a second network interface for communicating with the network; and
a controller coupled to and configured to manage the plurality of information handling systems via their respective host management controllers, the controller configured to:
receive a wake-up message, the wake-up message including an address identifying a particular one of the information handling systems to be awakened from a non-awake state of the particular information handling system;

identify the particular information handling system based at least on the address included in the received wake-up message;

cause a host management controller of the particular information handling system to awaken from a non-awake state of the host management controller; and after the host management controller of the particular information handling system has awakened, forward the wake-up message to the particular information handling system to cause the particular information handling system to awaken.

2. The system of claim 1, wherein the first network interface of the particular information handling system and the host management controller of the particular information handling system are not powered while the wake-up message is received by the controller.

3. The system of claim 2, wherein the first network interface of the particular information handling system is not powered on while the wake-up message is forwarded by the controller.

4. The system of claim 1, wherein the second network interface of the particular information handling system is configured to receive the wake-up message forwarded by the controller after the host management controller of the particular information handling system is awakened.

5. The system of claim 1, wherein the controller receives the wake-up message from the network via a host network interface of the controller.

6. The system of claim 1, further comprising an input/output module configured to:

manage communication of data between the network and the first network interface of each of the plurality of information handling systems;

receive the wake-up message from the network, prior to receipt of the wake-up message by the controller;

identify the particular information handling system based at least on the address included in the received wake-up message; and forward the wake-up message to the controller responsive to determining the particular information handling system is enabled for being awakened by the wake-up message.

7. The system of claim 1, wherein the wake-up message comprises one of a User Datagram Packet (UDP) broadcast packet and a Wake-on-LAN (WoL) Magic Packet.

8. A system, comprising:

a plurality of information handling systems, each including a first network interface for communicating with a network and a host management controller for managing the operation of various components of such information handling system wherein the host management controller includes a second network interface for communicating with the network;

an input/output module configured to:

manage communication of data between the network and the first network interface of each of the plurality of information handling systems;

receive a wake-up message, the wake-up message including an address identifying a particular one of the information handling systems to be awakened from a non-awake state of the particular information handling system;

identify the particular information handling system based at least on the address included in the received wake-up message; and forward the wake-up message to a controller responsive to determining the particular information handling system is enabled for being awakened by the wake-up message; and a controller coupled to and configured to manage the plurality of information handling systems via their respective host management controllers, the controller configured to:

receive the wake-up message from the input/output module;

identify the particular information handling system based at least on the address included in the received wake-up message; and forward the wake-up message to the particular information handling system to cause the particular information handling system to awaken.

9. The system of claim 8, wherein the first network interface of the particular information handling system and the host management controller of the particular information handling system are not powered while the wake-up message is received by the input/output module.

10. The system of claim 8, wherein the first network interface of the particular information handling system and the host management controller of the particular information handling system are not powered while the wake-up message is received by the controller.

11. The system of claim 10, wherein the first network interface of the particular information handling system is not powered on while the wake-up message is forwarded by the controller.

12. The system of claim 8, wherein the wake-up message comprises one of a User Datagram Packet (UDP) broadcast packet and a Wake-on-LAN (WoL) Magic Packet.

13. A system comprising:

a plurality of information handling systems, each including a first network interface for communicating with a network and a host management controller for managing the operation of various components of such information handling system wherein the host management controller includes a second network interface for communicating with the network; and a controller coupled to and configured to manage the plurality of information handling systems via their respective host management controllers, the controller configured to:

receive a wake-up message, the wake-up message including an address identifying a particular target comprising a particular one of the information handling systems or a particular one of the host management controllers to be awakened from a non-awake state;

identify the particular target based at least on the address included in the received wake-up message;

in response to identifying the particular target of the wake-up message as a particular one of the information handling systems:

cause a host management controller of the particular information handling system to awaken from a non-awake state of the host management controller; and after the host management controller of the particular information handling system has awakened, forward the wake-up message to the particular information handling system to cause the particular information handling system to awaken; and in response to identifying the particular target of the wake-up message as a particular one of the host management controllers, causing the particular host management controller to awaken.

14. The system of claim 13, wherein the first network interface of the particular information handling system and the host management controller of the particular information handling system are not powered while the wake-up message is received by the controller.

15. The system of claim 14, wherein the first network interface of the particular information handling system is not powered on while the wake-up message is forwarded by the controller.

16. The system of claim 13, wherein the second network interface of the particular information handling system is configured to receive the wake-up message forwarded by the controller after the host management controller of the particular information handling system is awakened.

17. The system of claim 13, the controller further configured to, in response to identifying the particular target of the wake-up message as the particular one of the host management controllers, power on the particular host management controller.

18. The system of claim 17, wherein the first network interface of the particular information handling system and the host management controller of the particular information handling system are not powered while the wake-up message is received by the controller.

19. The system of claim 13, further comprising an input/output module configured to:

manage communication of data between the network and the first network interface of each of the plurality of information handling systems;

receive the wake-up message from the network, prior to receipt of the wake-up message by the controller;

identify the particular information handling system based at least on the address included in the received wake-up message; and forward the wake-up message to the controller responsive to determining the particular target is enabled for being awakened by the wake-up message.

* * * * *